United States Patent
Terry (10) Patent No.: US 7,325,153 B2
(45) Date of Patent: Jan. 29, 2008

(54) OBTAINING CONFIGURATION DATA FOR A DATA PROCESSING APPARATUS

(75) Inventor: Alan J. Terry, London (GB)

(73) Assignee: NXP B.V., Eindhoven (NL)

( * ) Notice: Subject to any disclaimer, the term of this patent is extended or adjusted under 35 U.S.C. 154(b) by 416 days.

(21) Appl. No.: 10/522,466

(22) PCT Filed: Jul. 16, 2003

(86) PCT No.: PCT/IB03/03240

§ 371 (c)(1),
(2), (4) Date: Jan. 26, 2005

(87) PCT Pub. No.: WO2004/013754

PCT Pub. Date: Feb. 12, 2004

(65) Prior Publication Data

US 2006/0025982 A1 Feb. 2, 2006

(30) Foreign Application Priority Data

Jul. 31, 2002 (GB) ................................ 0217708.7

(51) Int. Cl.
G06F 1/14 (2006.01)
(52) U.S. Cl. .................. 713/501; 713/1; 713/503; 703/19
(58) Field of Classification Search ................ 713/501, 713/1, 503; 703/19
See application file for complete search history.

(56) References Cited

U.S. PATENT DOCUMENTS

| 3,906,346 A | * | 9/1975 | Hunter | ...................... 377/20 |
| 5,051,622 A | | 9/1991 | Pleva | |
| 5,144,948 A | * | 9/1992 | Andersson et al. | ........... 607/11 |
| 5,579,513 A | * | 11/1996 | Strohmer | .................... 713/600 |
| 5,740,200 A | * | 4/1998 | Kamata | ..................... 375/224 |

OTHER PUBLICATIONS

Anonymous: "Pulse Position Filter (PPF)", Research Disclosure, vol. 42, No. 419, Mar. 1, 1999, XP002298153.
Texas Instruments Incorporated: "NE555, NE555Y, SA555, SE555, SE555c Precision Timers", Online, Feb. 1, 1992, XP002298731.

* cited by examiner

*Primary Examiner*—Thuan Du
(74) *Attorney, Agent, or Firm*—Peter Zawilski (57) ABSTRACT

A method to obtain configuration data for a data processing apparatus by calculating (110) a time interval between the commencement of a mode (104) and a subsequent event (108). The calculated time interval is then compared (112) with one or more reference values (114). The result of the comparison is used to derive configuration data (116). The method may be further refined by including a calibration stage to reduce the error in the calculated time interval, thereby allowing comparison with a larger set of reference values (114), which in turn permits more configuration data to be derived from the calculated time interval.

22 Claims, 5 Drawing Sheets

OBTAINING CONFIGURATION DATA FOR A DATA PROCESSING APPARATUS

The present invention relates to data processing apparatus and in particular to the obtaining of configuration data for a data processing apparatus.

Many consumer products, for example TVs, VCRs, set-top-boxes, washing machines, toasters, etc., employ software running on one or more embedded microprocessors or microcontrollers in order to provide a rich set of functions and features for the end user. Typically, the number of software versions can be minimised by configuring the software locally in the product—thereby saving cost by maximising economies of scale. A further reason to configure the software locally may be to personalise the product, for example to provide some form of addressing.

A technique used to configure software running on an embedded microprocessor or microcontroller comprises applying a voltage to one or more pins of the device. For simple configuration tasks, for example selecting between two software programs, an input pin may be driven to one of two voltages to make the selection, representing 1 bit of configuration data. As a slight improvement three state (e.g. high, low, mid-rail) voltage pin driving may be used to achieve around 1.5 bits of configuration data per pin. However, more complex configuration data is often required, for example 8 bits, which would imply the use of at least 6 pins. Pins are expensive both in terms of device cost and printed circuit board (PCB) area, the latter becoming increasingly important in respect of compact portable products.

A further technique exists to increase the number of configuration bits per pin by employing additional hardware in the form of an Analogue to Digital Converter (ADC) integrated with the embedded microprocessor or microcontroller. The number of bits per pin is dependent on the resolution capability (cost) of the ADC; to improve resolution the ADC may be shared by more than one pin, at the expense of using more pins. Furthermore, such solutions tend to utilise a voltage divider which may have a standing current all the time the product is powered—such a power penalty may be unacceptable for battery powered products both in terms of battery life and for environmental reasons. A yet further disadvantage of employing an ADC is that the voltage biasing of the pin may prevent or constrain a possible additional utilisation of the pin by an application program.

It is an object of the present invention to solve these and other problems by the use of an improved method and apparatus for obtaining configuration data for a data processing apparatus.

In accordance with the present invention there is provided a method for obtaining configuration data for a data processing apparatus, the apparatus cooperating with a timing unit, the method comprising the steps of:
a) commencing a first mode of the timing unit;
b) detecting a first event, which first event occurs after the commencement of the first mode, the first event being caused by the timing unit;
c) calculating a first time interval between the commencement of the first mode and the first event;
d) performing a first comparison between the calculated first time interval and a first reference time interval; and
e) determining configuration data in dependence on the result of the first comparison.

Prior to executing an application program on a data processing apparatus, it may be necessary to perform configuration tasks to, for example, ensure that the desired application program is selected for execution, or that the application program executes according to certain selectable options. Configuration tasks may be identified to the apparatus by configuration data obtained by any suitable method including, but not limited to, reading or executing code associated with (but separate from) the application program, reading data held within the apparatus, reading or deriving data from an external input or stimulus; in addition, configuration data may be obtained from any combination of these methods. The present invention concerns the derivation of configuration data from an external input or stimulus to the apparatus (excluding the provision by an external source of data per se).

The data processing apparatus may cooperate with a timing unit for the purpose of obtaining configuration data. The timing unit may, as required, generate and output signals or stimuli for the data processing apparatus; which generation and output may be in response to, or be independent of, the data processing apparatus. These signals or stimuli may be detected and utilised by the data processing apparatus to derive configuration data. In particular the data processing apparatus may arrange for a time interval, bounded by a signal or stimulus to be measured. The measured time interval value may then be compared with a stored value in order to derive configuration data. The timing unit may generate and output signals or stimuli in an astable fashion or, preferably, in a monostable fashion in response to instruction from the data processing apparatus. In the monostable case, the data processing apparatus may issue an instruction to the timing unit to commence a particular mode; in the astable case, the data processing apparatus may derive the present mode from inspecting the signal or stimulus output of the timing unit since the timing unit in this case may commence a particular mode independently of the data processing apparatus. The prompting of the data processing apparatus to instruct the timing unit to commence a particular mode may be in response to, but not limited to, a voltage applied to the data processing apparatus (e.g. at power-up) or software running on the data processing apparatus (e.g. when changing between application programs, or for other reasons). Methods of sensing of a voltage applied to a data processing apparatus are well known in the art and include, but are not limited to, polling and interrupt.

The timing unit may output to a data processing apparatus an event signal which includes, but is not limited to, a voltage impulse, a voltage transition or a voltage value/level. For example, the data processing apparatus might be arranged to receive and detect a voltage transition from the timing unit and in response perform one or more tasks concerned with calculating the time interval bounded by the event represented by the voltage transition, for example stop a counter, read and/or record a value of a clock or counter, etc. The data processing apparatus may also be arranged to count time periods for a duration within the time interval.

Calculation of the time interval between the commencement of a timing unit mode and the occurrence of a subsequent event may be performed using the value of counted time periods and/or using timestamps related to the time interval. Timestamps may be derived from clock or counter values read, for example, at the commencement of the timing unit mode and/or when the subsequent event occurred. Once the time interval has been calculated it is compared with a reference time interval available to the data processing apparatus, for example stored in non-volatile storage within the data processing apparatus. In general, it is desirable to utilise as large a range of reference time interval values as possible for the comparison so as to maximise the number of bits of configuration data that can be derived from the calculated time interval. In practice, as will be apparent to the skilled person, the ability to resolve the calculated time interval (i.e. compare it with a broad range of reference time intervals) is dependent on the accuracy (i.e. time spread) of the calculated time interval. An advantage of the method is that by calculating a time interval a data processing apparatus may derive configuration data to perform required configuration tasks using a reduced input capacity allocated to configuration compared to that used in the prior art, and in particular prior art methods which do not employ an ADC.

In accordance with a further aspect of the present invention there is provided a refinement of the method for obtaining configuration data for a data processing apparatus, wherein following step d) the method further comprising the steps of:

I. calculating an error value in dependence on the result of the first comparison;
II. commencing a second mode of the timing unit;
III. detecting a second event, which second event occurs after the commencement of the second mode, the second event being caused by the timing unit;
IV. calculating a second time interval between the commencement of the second mode and the second event;
V. adjusting the calculated second time interval in dependence on the error value;
VI. performing a second comparison between the adjusted second time interval and a second reference time interval; and
VII. determining configuration data in dependence on the result of the second comparison.

The method of the invention can be refined to accommodate applications where it is difficult to achieve the desired accuracy of the calculated timing interval for cost or other reasons. A particular issue lies with the data processing apparatus itself where the tolerance spread of characteristics used in the measurement of the time interval may be broad due to the process or materials used in the fabrication of the data processing apparatus, for example the tolerance of an internal reference voltage used to determine the logic level of a voltage applied to an input pin of a microcontroller device. It may be possible to improve such tolerances by using specially selected or designed devices, however these options usually incur heavy cost penalties. Another issue is where the timing unit employs low cost components which have inherently wide tolerances, for example capacitors. The refinement of the method of the invention is advantageous in that it provides means to identify the error due to tolerance variation for a particular combination of data processing apparatus and timing unit and then to compensate for this error in the calculated time interval used for obtaining configuration data.

The first error identification stage comprises the measurement of a known nominal time interval as generated by a timing unit. This measurement is compared with a reference representing the precise value of the time interval; the difference being the error for the particular combination of data processing apparatus and timing unit. The timing interval of the timing unit is then adapted (e.g. by substituting a timing element of the timing unit) and a second time interval calculation is made. Preferably, the adaptation is according to one of a pre-determined set of timing intervals (e.g. a substitute timing element is selected from a pre-determined set of values), allowing a corresponding set of reference values to be used at the comparison stage with a commensurate simplification of decision making. Preferably, where a timing element of the timing unit is substituted to adapt the timing interval, both the original and the substituted timing element are accurate (that is, they have a narrow tolerance with respect to their nominal value); this helps ensure that the error remains substantially the same for each of the time interval measurements; an example of a suitable timing element includes, but is not limited to, a metal film resistor (which also has the advantage of being low cost). The second calculated time interval may then be adjusted using the error value to derive a more accurate value for the second time interval. This adjusted second time interval value is then compared to a range of reference values, preferably the corresponding set of reference values as discussed above. As will be apparent to the skilled person, where the adjusted second time interval has less error with respect to its corresponding reference time interval, the easier it is to resolve closer spaced (i.e. more) time intervals; this in turn offers the ability to derive more configuration data per measurement. An advantage of the refined method is that a first known time interval is measured; the error in the measurement is then derived and used to correct a second measured time interval—thereby making the second measurement more accurate and increasing the number of possible time intervals that may be resolved and used to derive configuration data for the data processing apparatus.

A further enhancement is that the first error identification stage of the method may also be used to derive configuration data for the processing system in dependence on the result of the first comparison in that, for example, it may be possible to resolve a plurality of timing intervals at this stage; this is achieved in a similar fashion to the basic method described earlier. As before, it will be apparent that the total number of time intervals that can be resolved is dependent on the anticipated error.

For the refined method, a timing unit mode may be commenced and events detected using the same methods as described earlier for the basic method. Similarly, the data processing apparatus may also arrange to count time periods for a duration within a time interval. Calculation of a time interval between the commencement of a timing unit mode and the occurrence of a subsequent event may be performed using the value of counted time periods and/or using timestamps related to the time interval.

In accordance with a further aspect of the present invention there is provided a data processing apparatus operable to interface to a timing unit and to perform a method according to the invention, the data processing apparatus comprising:

a first port operable to receive an event signal;
non-volatile storage operable to store a configuration program and data related to said configuration program;
storage operable to store data of computation; and
a CPU operable to run said configuration program.

The method of the present invention relies on a data processing apparatus capable of interfacing to a suitable timing unit. Examples of suitable data processing apparatus include, but are not limited to, computing devices (e.g. PC, PDA, workstations), industrial products and consumer products which operate under control of built in software (for example TV, VCR, DVD, security systems, remote controls, telephones, toys, kitchen appliances, etc.). In particular, the data processing apparatus must have means, such as a port, by which to interface to a timing unit such that events from the timing unit can be received. Products which utilise microprocessors or microcontrollers operating under the control of software embedded within the product and which do not have the ability to acquire or read configuration data from an external source could particularly benefit from the invention.

The data processing apparatus may comprise a conventional CPU, program and data storage interconnected by bus means, the various constructions of which are readily identifiable by the skilled person. In addition the data processing apparatus may comprise a port operable to send a mode indication signal. In some embodiments, the event signal and mode indication signal may be supported by the same port. The event signal may be generated by a device external to the data processing apparatus, for example a timing unit, further discussed below. Generally, the mode indication signal will be sent from the data processing apparatus to a timing unit to indicate a mode to that timing unit. An advantage of the present invention is that it may be implemented using low cost devices typically employed in consumer products.

In accordance with a further aspect of the present invention, there is provided a timing unit operable to interface to a data processing apparatus as recited above, the timing unit comprising:

a first port operable to output an event signal; and
a circuit operable to generate said event signal.

The timing unit interfaces to a data processing apparatus. The timing unit may generate event signals either independently or in response to the receipt of a mode indication signal. The interface of the timing unit may comprise separate ports for the event signal and mode indication signal respectively, or these signals may be combined on the same port. The timing unit may comprise circuitry to generate event signals suitable for detection by a particular data processing apparatus; such circuitry may operate under hardware or software control. Examples of possible types of event signal include, but are not limited to, a voltage pulse, a voltage transition or a periodically varying voltage. In practice such event signals might be generated using circuit means including, but not limited to, an impulse generator, a monostable multivibrator or an astable/periodic clock generator. Preferably an RC network circuit is employed for the timing unit. In a preferred embodiment such an RC circuit can be used to implement a monostable multivibrator function in cooperation with the data processing apparatus.

Further features and advantages will now be described, by way of example only, with reference to the accompanying drawings in which.

Within the following description of embodiments of the present invention, the term 'data processing apparatus' refers to any embodiment of apparatus capable of operating according to the methods of the present invention and having at least one port to receive an event signal. The term 'event signal' refers to an external input or stimulus applied to a port of the data processing apparatus. The term 'mode indication signal' refers to a signal output by the data processing apparatus to indicate a mode to a timing unit.

Figure 1:
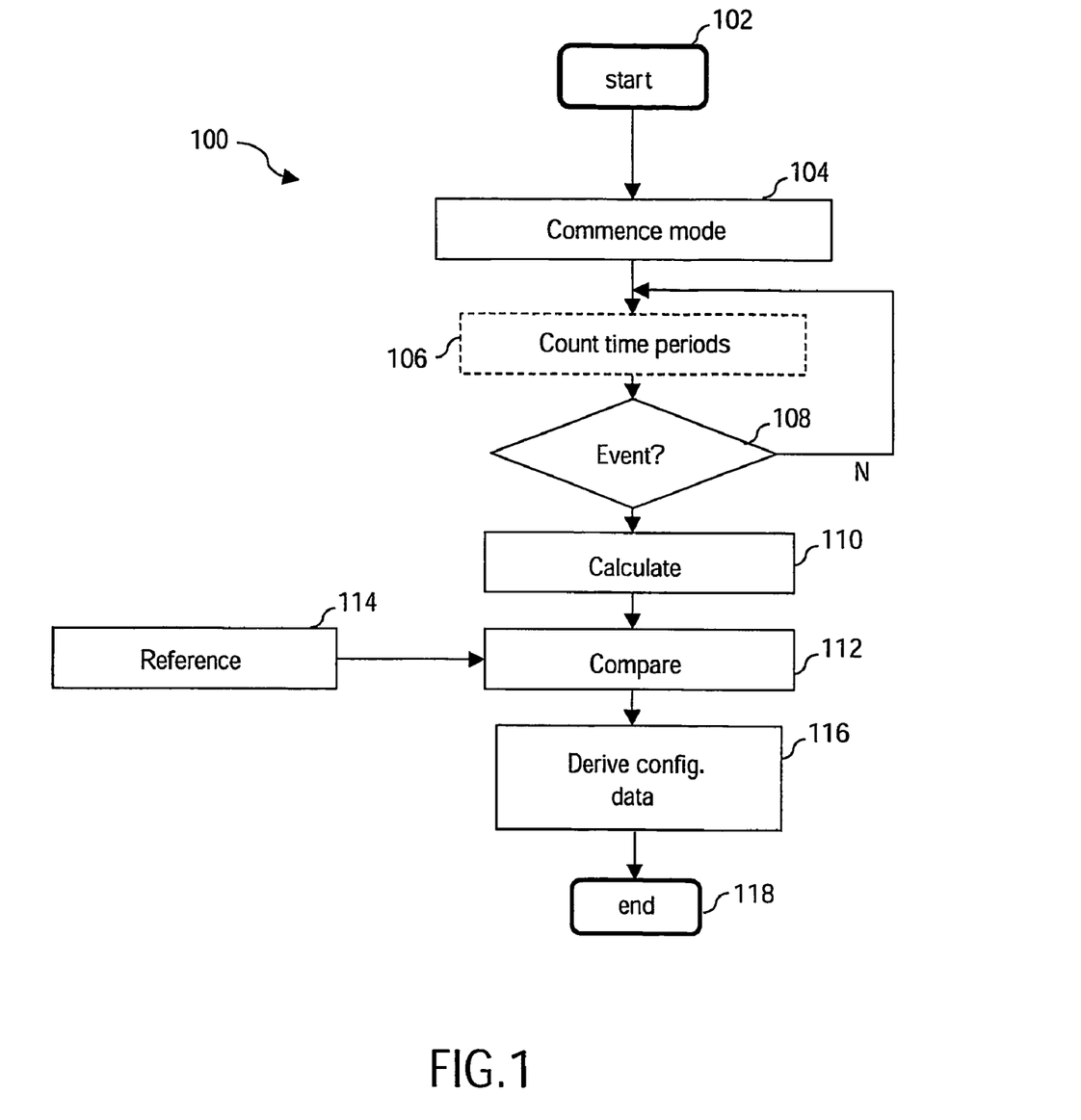
FIG. 1 is a flow diagram of a method embodying the invention.

FIG. 1 shows a flow diagram of a method embodying the invention. The method, shown generally at 100, starts at 102 and a mode of a timing unit is commenced at 104. Optionally, at 106, time periods could be counted pending the occurrence of an event 108 caused by the timing unit. The value of the time interval between the commencement of the mode and the event is calculated 110 and compared 112 with a reference value 114; the result of the comparison is used to derive configuration data 116. The method ends at 118.

Figure 2:
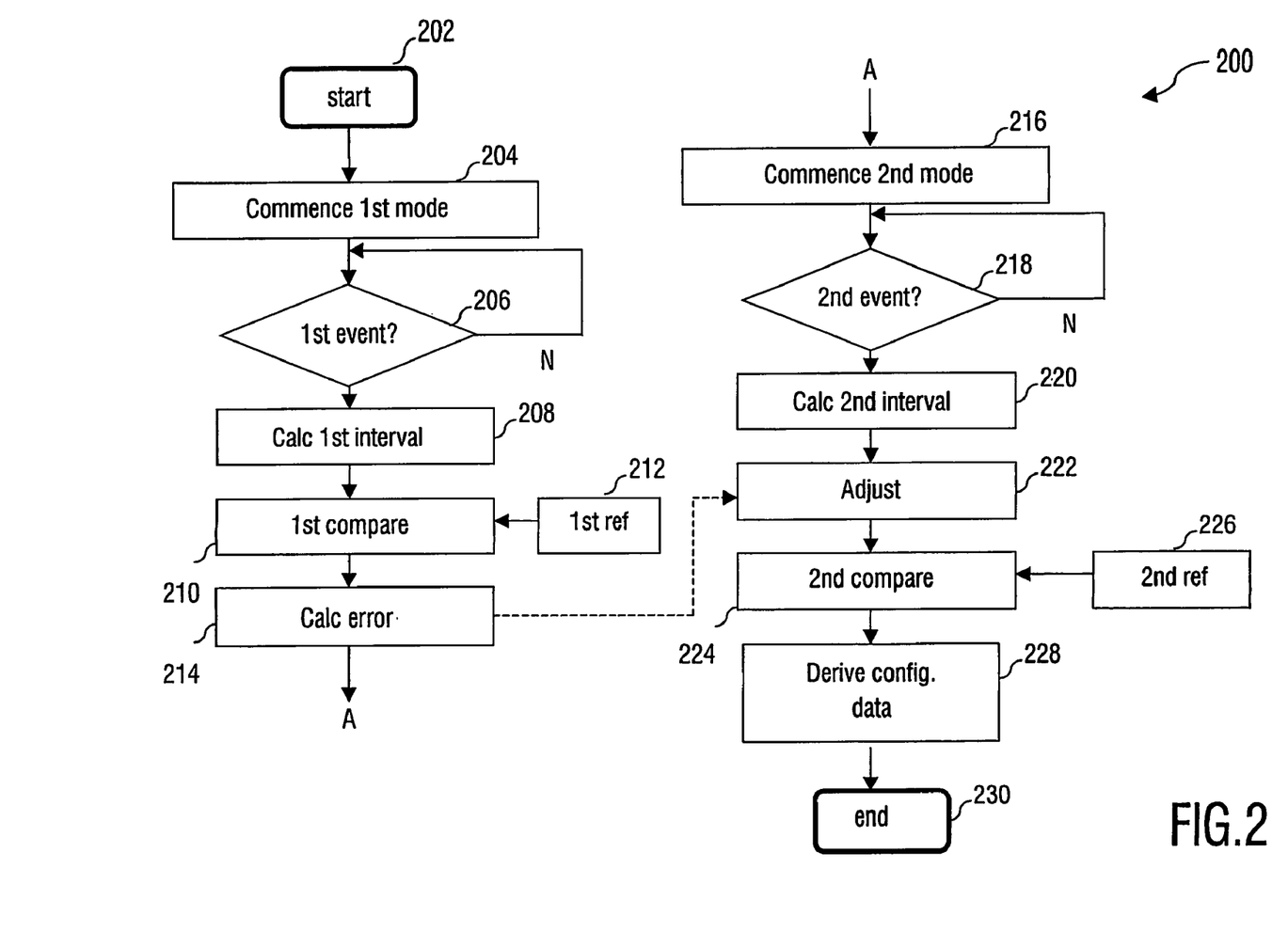
FIG. 2 is a flow diagram of a refined method embodying the invention.

FIG. 2 shows a flow diagram of a refined method embodying the invention. The method, shown generally at 200, starts at 202 and a first mode of a timing unit is commenced at 204. As discussed in relation to FIG. 1, optionally (and not shown in FIG. 2) time periods could be counted pending the occurrence of a first event 206 received from the timing unit. The value of a first time interval between the commencement of the first mode and the first event is calculated 208 and compared 210 with a first reference value 212; the result of the comparison enables an error value 214 to be calculated and optionally also the derivation of configuration data (not shown in FIG. 2). The method continues where a second mode of the timing unit is commenced at 216. Again, optionally (and not shown in FIG. 2) time periods could be counted pending the occurrence of a second event 218 received from the timing unit. The value of a second time interval between the commencement of the second mode and the second event is calculated 220. This calculated value is adjusted 222 using error value 214. The adjusted second time interval is then compared 224 with a second reference value 226; the result of the comparison is used to derive configuration data 228. The method ends at 230.

Figure 3:
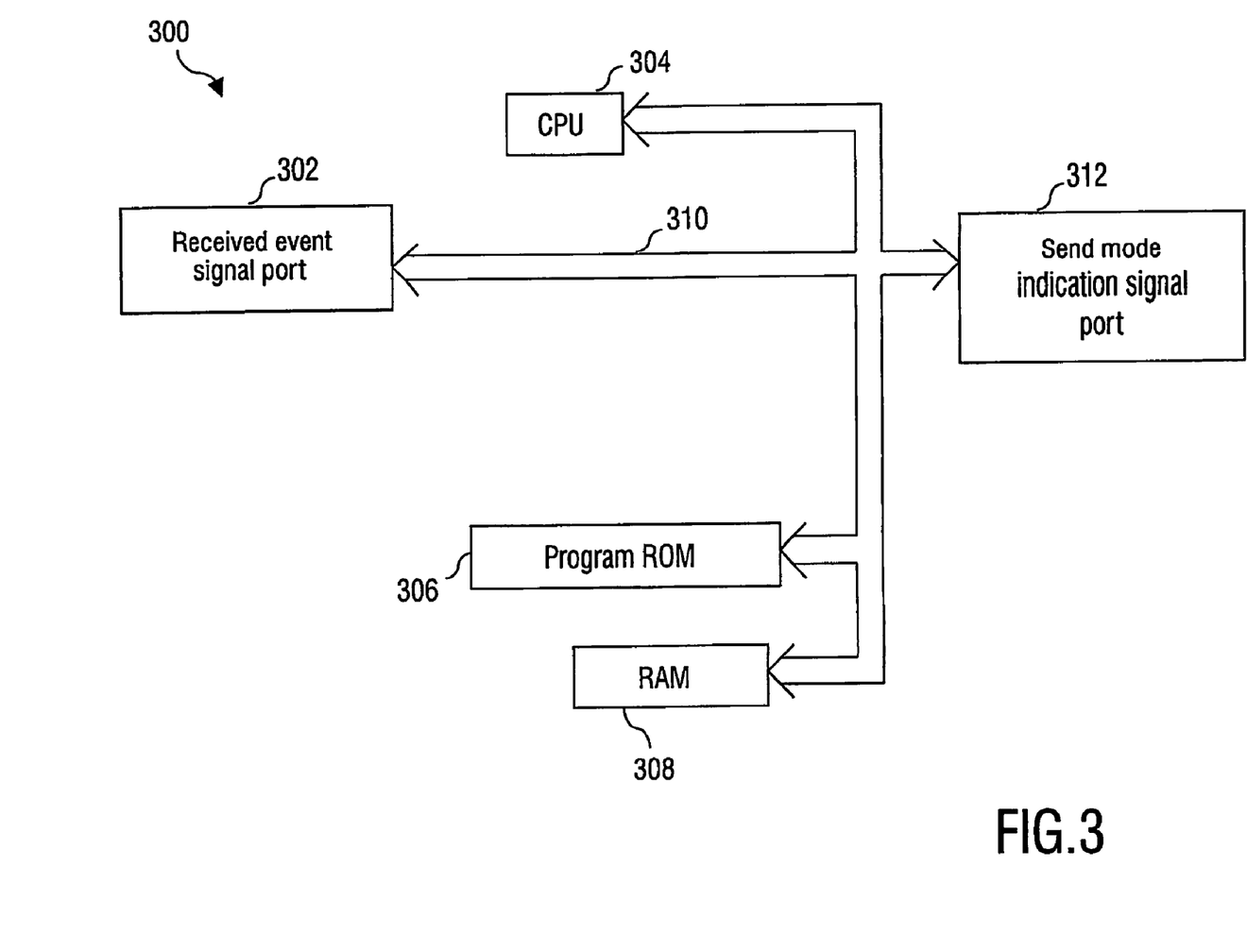
FIG. 3 is a schematic representation of an embodiment of a data processing apparatus.

FIG. 3 shows a schematic representation of an embodiment of a data processing apparatus. The data processing apparatus, shown generally at 300, comprises a first port 302 operable to receive an event signal, a CPU 304, program ROM 306, RAM, 308 and a second port 312 operable to send a mode indication signal; all elements are interconnected by bus 310 according to any of the methods well known to the skilled person. The data processing apparatus may be integrated within a device such as a microprocessor or microcontroller; alternatively it may be a larger system wherein one or more elements is a separate entity.

Figure 4:
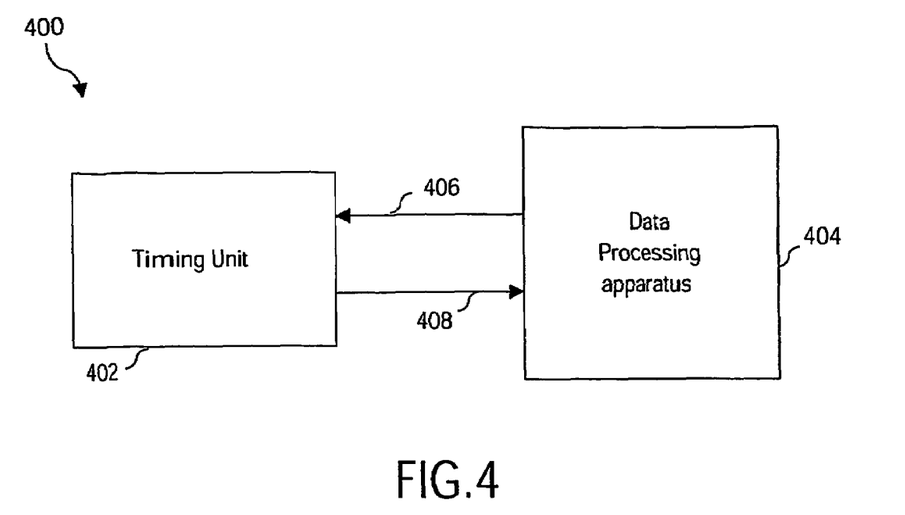
FIG. 4 is a schematic representation of an embodiment of a data processing apparatus cooperating with a timing unit.

FIG. 4 shows a schematic representation of an embodiment of a data processing apparatus cooperating with a timing unit. The system, shown generally at 400, comprises a timing unit 402 and a data processing apparatus 404. The data processing apparatus sends a mode indication signal 406 to the timing unit 402 which in response subsequently sends event signal 408 to the data processing apparatus. It should be noted that, in the case where the timing unit sends an astable/periodic event signal, it may not be necessary for the data processing apparatus to send the mode indication signal 406—the data processing apparatus may simply deduce the mode of the timing unit (e.g. using pre-stored data) and measure, as an example, the time interval between relevant event signals.

Figure 5:
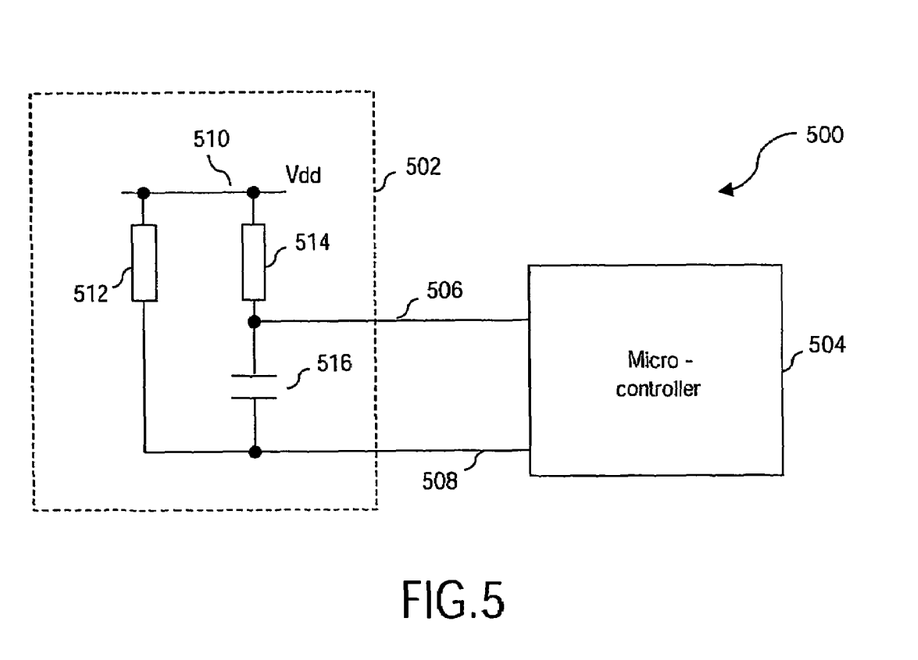
FIG. 5 is a schematic representation of a preferred embodiment of the invention comprising a microcontroller cooperating with a RC network timing unit.

FIG. 5 shows a schematic representation of a preferred embodiment of the invention comprising a microcontroller cooperating with a RC network timing unit. The system, shown generally at 500, comprises a timing unit 502 (shown in dashed outline) connected by connections 506, 508 to a microcontroller 504. In this embodiment, connections 506, 508 perform both mode indication signalling and event signalling as described in the following. To prepare for a first (calibration) mode, the microcontroller 504 simultaneously grounds each end of capacitor 516 using lines 506, 508, thereby discharging capacitor 516. The first mode is signalled to the timing unit 502 by the microcontroller 504 releasing line 506 (whilst line 508 still grounds the lower end of capacitor 516) and making line 506 an input; the microcontroller also begins to count time periods, for example by incrementing an internal counter under software control. Capacitor 516 begins to charge via known and accurate resistance 514. Subsequently, at some level of voltage on the capacitor 516, the microcontroller will detect a logic 1 on line 506. The microcontroller will then stop incrementing the counter. The value of the counter is then compared with a stored value corresponding to that expected using the known resistance 514. The difference in the values mostly corresponds to the error due to the capacitor and various other tolerances within the microcontroller. The procedure is then repeated for another accurate resistance 512, which preferably is selected from a range of predetermined values. As preparation for a second (derive configuration data) mode, the microcontroller 504 again simultaneously grounds each end of capacitor 516 using lines 506, 508, thereby discharging capacitor 516. The second mode is signalled to the timing unit 502 by the microcontroller 504 releasing line 508 (whilst line 506 grounds the upper end of capacitor 516) and making line 508 an input; the microcontroller again begins to count time periods, for example by incrementing an internal counter under software control. Capacitor 516 begins to charge via resistance 512. At some level of voltage on the capacitor 516, the microcontroller will detect a logic 1 on line 508. The microcontroller then stops incrementing the counter. The value of the counter is then adjusted using the error value calculated earlier, thereby compensating for the capacitor and microcontroller tolerance errors. The adjusted counter value is then compared with a range of reference values, preferably those corresponding to the range of predetermined values for resistance 512 as described earlier. The closest match represents the configuration data denoted by the value of resistance 512. The method may allow a large set (range) of counter values (time intervals) to be resolved by the data processing apparatus in that the adjustment (compensation) reduces the error in the counter value obtained using the particular resistance 512. The calibration mode might also be used to derive some additional configuration data.

Figure 6:
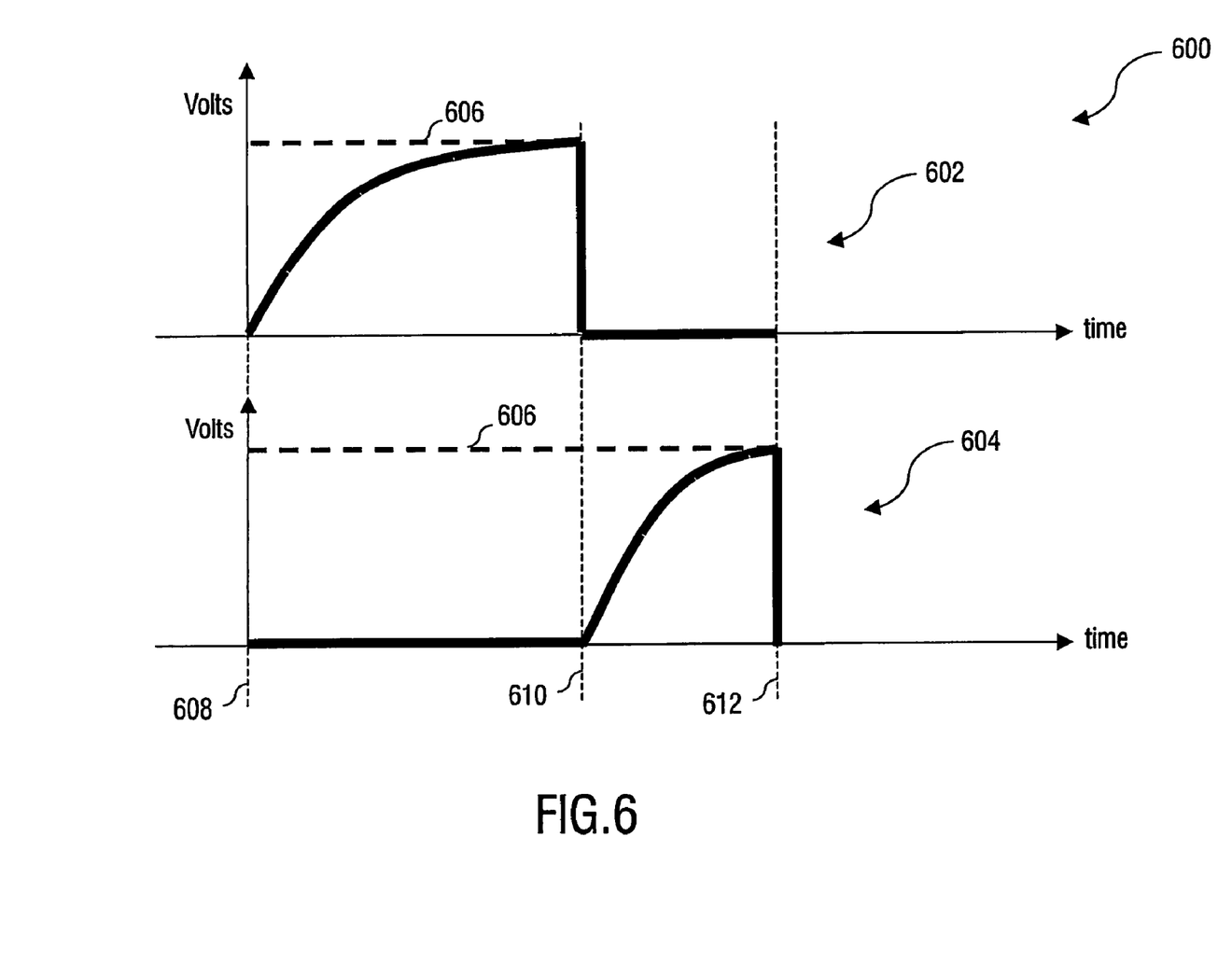
FIG. 6 is a schematic representation depicting mode indication signals and event signals in relation to the embodiment of FIG. 5.

FIG. 6 shows a schematic representation depicting mode indication signals and event signals in relation to the embodiment of FIG. 5. Waveforms, shown generally at 600, of voltages at lines 506, 508 are shown at 602 and 604 respectively. The logic high detection voltage threshold of the microcontroller is at 606. The 'calibration mode' is depicted between 608 and 610. The 'derive configuration data mode' is depicted between 610 and 612.

The foregoing methods and implementations are presented by way of example only and represent a selection of a range of methods and implementations that can readily be identified by a person skilled in the art to exploit the advantages of the present invention.

In the description above and with reference to FIG. 1 there is disclosed a method to obtain configuration data for a data processing apparatus by calculating 110 a time interval between the commencement of a mode 104 and a subsequent event 108. The calculated time interval is then compared 112 with one or more reference values 114. The result of the comparison is used to derive configuration data 116. The method may be further refined by including a calibration stage to reduce the error in the calculated time interval, thereby allowing comparison with a larger set of reference values 114, which in turn permits more configuration data to be derived from the calculated time interval.

The invention claimed is:

1. A method for, from a timing unit, obtaining configuration data for a data processing apparatus, the method comprising the steps of:
    storing configuration data in the timing unit via a circuit element having a value that corresponds to the configuration data;
    commencing a first mode of the timing unit;
    detecting a first event, which first event occurs after the commencement of the first mode, the first event being caused by the timing unit and responsive to the value of the circuit element;
    calculating a first time interval between the commencement of the first mode and the first event;
    performing a first comparison between the calculated first time interval and a first reference time interval; and
    determining the configuration data in dependence on the result of the first comparison.

2. A method as claimed in claim 1, wherein following the step of performing a first comparison, the method further comprising the steps of:
    I. calculating an error value in dependence on the result of the first comparison;
    commencing a second mode of the timing unit;
    detecting a second event, which second event occurs after the commencement of the second mode, the second event being caused by the timing unit;
    calculating a second time interval between the commencement of the second mode and the second event;
    adjusting the calculated second time interval in dependence on the error value; and
    performing a second comparison between the adjusted second time interval and a second reference time interval;
    wherein the step of determining the configuration data is also in dependence on the result of the second comparison.

3. A method as claimed in claim 2, wherein following the step of commencing a second mode, the method further comprises the step of:
    counting time periods.

4. A method as claimed in claim 2, wherein following step I the method further comprises the step of:
    determining configuration data in dependence on the result of the first comparison.

5. A method as claimed in claim 1, wherein following the step of commencing a first mode, the method further comprises the step of:
    counting time periods.

6. A method as claimed in claim 5, wherein the first time interval is calculated using the counted time periods.

7. A method as claimed in claim 1, wherein the first mode is commenced in response to a voltage applied to the data processing apparatus.

8. A method as claimed in claim 1, wherein the first event is detected in response to a voltage applied to the data processing apparatus.

9. A method as claimed in claim 1, wherein the first mode is commenced in response to software running on the data processing apparatus.

10. A method as claimed in claim 1, wherein the first mode is commenced in nonnal operation of the timing unit independently of the data processing apparatus.

11. A method as claimed in claim 1, wherein the first time interval is calculated by using a timestamp.

12. A data processing apparatus comprising:
a timing unit to generate a first event signal, the timina unit having a first mode of operation;
a first port to receive the first event signal;
non-volatile storage to store a software program and data related to said software program; and
a CPU to calculate a first time interval between commencement of the first mode of operation of the timing unit and the receipt of the first event signal by the first port, to perform a first comparison between the calculated first time interval and a first reference time interval, to determine configuration data in dependence on a result of the first comparison, and to run said software program in response to the configuration data.

13. A data processing apparatus according to claim 12, wherein the first port outputs a mode indication signal.

14. A data processing apparatus according to claim 13, wherein the timing unit includes
a first port to receive the mode indication signal and to output the first event signal; and
a circuit to generate the first event signal in response to and subsequent to the mode indication signal.

15. A data processing apparatus according to claim 12, further comprising:
a second port to output a mode indication signal.

16. A data processing apparatus according to claim 15, wherein the timing unit includes:
a first port to receive the mode indication signal;
a second port to output the first event signal; and
a circuit to generate the first event signal in response to and subsequent to the mode indication signal.

17. A data processing apparatus according to claim 12, wherein the timing unit includes
a first port to output the first event signal; and
a circuit to generate the first event signal.

18. A data processing apparatus according to claim 12, wherein the first event signal is a voltage pulse.

19. A data processing apnaratus according to claim 12, wherein the first event signal is a voltage transition.

20. A data processing apparatus according to claim 12, wherein the first event signal is a periodically varying voltage.

21. A data processing apparatus according to claim 12, wherein the timing unit includes an RC network that determines the first time interval.

22. A data processing apparatus according to claim 12, wherein the non-volatile storage further stores software configured to calculate the first time interval between commencement of the first mode of the timing unit and the receipt of the first event signal by the first port, to perform the first comparison between the calculated first time interval and the first reference time interval, and to determine the configuration data in dependence on the result of the first comparison.

* * * * *